(12) United States Patent
Langhammer et al.

(10) Patent No.: US 11,490,471 B2
(45) Date of Patent: Nov. 1, 2022

(54) ADAPTIVE POWER CONTROL OF A MICROWAVE OVEN FOR COEXISTENCE WITH WIRELESS NETWORKS

(71) Applicant: Miele & Cie. KG, Guetersloh (DE)

(72) Inventors: Nils Langhammer, Verl (DE); Frank Deter, Oelde (DE); Olaf Bloemker, Warendorf (DE); Michael Junkmann, Rietberg (DE); Christian Boemke, Verl (DE)

(73) Assignee: MIELE & CIE. KG, Guetersloh (DE)

( * ) Notice: Subject to any disclaimer, the term of this patent is extended or adjusted under 35 U.S.C. 154(b) by 568 days.

(21) Appl. No.: 16/546,342

(22) Filed: Aug. 21, 2019

(65) Prior Publication Data

US 2020/0068671 A1    Feb. 27, 2020

(30) Foreign Application Priority Data

Aug. 23, 2018    (DE) ..................... 10 2018 120 573.2

(51) Int. Cl.
*H05B 6/66* (2006.01)
*H05B 6/64* (2006.01)
*H05B 6/68* (2006.01)

(52) U.S. Cl.
CPC .......... *H05B 6/664* (2013.01); *H05B 6/6467* (2013.01); *H05B 6/668* (2013.01); *H05B 6/681* (2013.01)

(58) Field of Classification Search
CPC ..... H04W 84/12; H05B 6/6467; H05B 6/664; H05B 6/668; H05B 6/68; H05B 6/681
USPC ....... 219/702, 715, 717, 718, 722, 723, 770, 219/761; 370/338; 375/295, 296
See application file for complete search history.

(56) References Cited

U.S. PATENT DOCUMENTS

| | | |
|---|---|---|
| 2007/0280332 A1 | 12/2007 | Srikanteswara et al. |
| 2009/0005092 A1 | 1/2009 | Li et al. |
| 2009/0156121 A1 | 6/2009 | Stahl et al. |
| 2011/0071696 A1* | 3/2011 | Burt ............... H05B 1/0266 700/295 |
| 2017/0188388 A1 | 6/2017 | Nakajima et al. |

\* cited by examiner

*Primary Examiner* — Quang T Van
(74) *Attorney, Agent, or Firm* — Leydig, Voit & Mayer, Ltd.

(57) ABSTRACT

A household appliance includes: a magnetron for generating microwaves during operation; a power supply unit; and a controller for specifying to the power supply unit a power level for the operation of the magnetron. The controller temporarily reduces, in a coexistence mode, the power level specified to the power supply unit for the operation of the magnetron in a manner that reduces or prevents disturbance of communication in a wireless network using beacon frames due to the microwaves generated by the magnetron.

9 Claims, 1 Drawing Sheet

ADAPTIVE POWER CONTROL OF A MICROWAVE OVEN FOR COEXISTENCE WITH WIRELESS NETWORKS

CROSS-REFERENCE TO PRIOR APPLICATION

Priority is claimed to German Patent Application No. DE 10 2018 120 573.2, filed on Aug. 23, 2018, the entire disclosure of which is hereby incorporated by reference herein.

FIELD

The present invention relates to a household appliance including a magnetron adapted to generate microwaves during operation, a power supply unit, and a controller adapted to specify to the power supply unit the power level for the operation of the magnetron.

BACKGROUND

Sometimes very high power levels in the range of from several 100 W to several 1000 W are used during heating. This power is delivered to the food load in the form of high-frequency radiation. Parallel to the microwave, various wireless networks, such as WLAN, Bluetooth or ZigBee (IEEE 802.11), operate in the same frequency band. However, these wireless networks use very low transmission power levels of no more than 100 mW, which are many times lower than that of the microwave appliance. As a result, the wireless network can be significantly disturbed during the operation of the microwave appliance, even to the point of complete failure.

With the introduction of networked devices, control via smartphones, and other 2.4 GHz-based digital applications, such disturbances have become, and are becoming, increasingly relevant in practice. Microwave operation can disturb both a WLAN station in the microwave appliance itself and a neighboring WLAN station in another device. The problem can be outlined even better for two types of microwave devices.

If the microwave is operated with a transformer power supply at 50 Hz line voltage, the high-frequency radiation is active for a period of about 10 ms during the positive half cycle and then inactive for about 10 ms. During the inactive period, a WLAN system or, more generally, a 2.4 GHz system can transmit data because the radio channel is not disturbed. However, throughput is reduced by 50%.

The second, much more critical case is a microwave appliance having a switched-mode power supply. Here, the pauses are significantly shorter. For example, a microwave operation period of about 8 ms is followed by a brief pause of about 2 ms. However, for some WLAN access points (AP) and WLAN stations (STA), these pauses are too short to be useful for data transmission. In particular, the IEEE 802.11 beacon frames, which are transmitted in a time interval of ~100 ms, are very important for the operation of a WLAN network. Operation is only possible if a certain number of these frames are successfully transmitted during the 2 ms silent period. However, the likelihood that the WLAN-AP will hit the pause is very low.

This is where the present invention comes in, which includes adaptively controlling the power of a microwave appliance, so that WLAN operation and microwave operation can be reliably accomplished in parallel, thereby ensuring coexistence therebetween.

Household appliances with microwave often use switched-mode power supplies (inverters) for new developments. One reason is that such inverters allow operation with real power levels below the maximum power of the microwave generator, whereas transformer-based solutions generally (have to) operate with a PWM-like control.

In addition, if the appliance is networked, the networking functions may be significantly impaired by the microwave if the same frequency band (2.4 GHz) is used. An alternative would be to use 5 GHz WLAN.

In the original approach with a transformer power supply, the pauses were longer due to the technology used, so that the problem hardly occurs in that approach. Some manufacturers of access points use microwave detection and systematically place the beacons in the 2 ms pause, thereby reducing susceptibility to interference. In this connection, the attempt is made to react to the interferer. However, in many access points, problems occur relatively frequently.

The use of 5 GHz WLAN requires more complex hardware and has a significantly limited range compared to 2.4 GHz. Furthermore, the approval process for 5 GHz significantly more complex and more expensive.

An improvement by way of the access point can only be implemented by the manufacturer of the access point. However, many devices normally operate as a WLAN station, so that this solution does not work here since WLAN stations rely on the reception of beacons. If the access point sends beacons at the wrong time, they collide with the microwave operation and therefore cannot be received. This results in a connection loss. In addition, the access point must serve further wireless stations, and thus cannot focus on the microwave appliance alone.

SUMMARY

In an embodiment, the present invention provides a household appliance, comprising: a magnetron configured to generate microwaves during operation; a power supply unit; and a controller configured to specify to the power supply unit a power level for the operation of the magnetron, wherein the controller is configured to temporarily reduce, in a coexistence mode, the power level specified to the power supply unit for the operation of the magnetron in a manner that reduces or prevents disturbance of communication in a wireless network using beacon frames due to the microwaves generated by the magnetron.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
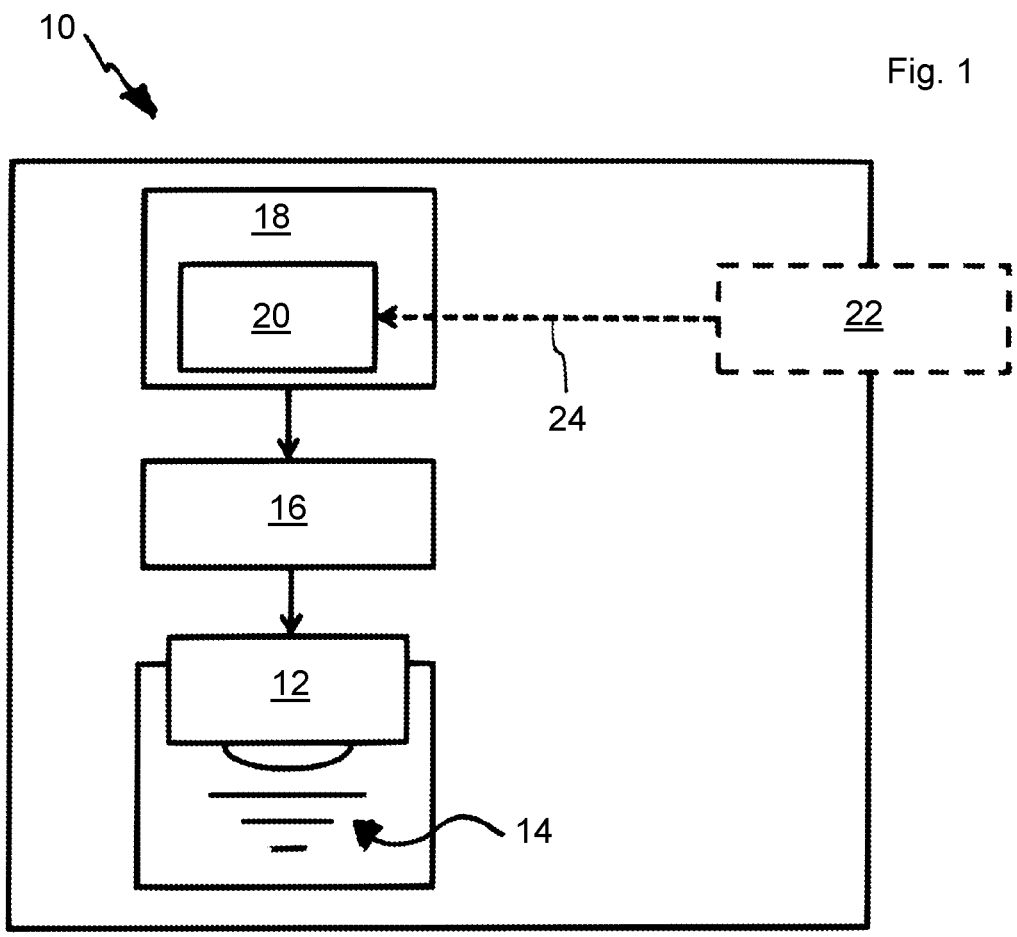
FIG. 1 is a schematic view of an embodiment of the household appliance according to the present invention.

The invention relates to a method for controlling the operation of a household appliance, including the steps of: generating microwaves by means of a magnetron of the household appliance and controlling the power level for the operation of the magnetron by means of a controller of the household appliance.

In particular, the present invention relates to an adaptive power control for household appliances having an integrated microwave as well as separate microwave appliances. The microwave includes a high-frequency generator in the 2.4 GHz ISM band. One variant is composed of a magnetron and a high-voltage switched mode power supply, and is used to heat food by means of high-frequency radiation.

An embodiment of the present invention at least reduces impairment of the communication in a wireless network due to the operation of a microwave appliance.

In an embodiment, the present invention provides a household appliance of the type mentioned at the outset, the controller of the inventive household appliance being adapted to temporarily reduce, in a coexistence mode, the power level specified to the power supply unit for the operation of the magnetron in a manner that reduces or prevents disturbance of the communication in a wireless network using beacon frames due to the microwaves generated by the magnetron.

The present invention makes use of the realization that beacon frames can be transmitted during the temporary reduction in the power level, which makes it possible to reduce or even prevent disturbances in the communication between the devices present in the wireless network. The household appliance uses a coexistence algorithm which allows communication within the wireless network and microwave operation to take place simultaneously.

If the household appliance itself participates in the communication over the wireless network, the temporary reduction in the power level reduces or prevents disturbance of its own communication. The reduction in the power level may, in fact, lead to reduced data rates, but these are sufficient for household appliance applications. Unlike the prior art, the wireless communication of a microwave appliance is not significantly disturbed by the microwaves.

The controller of the household appliance is preferably adapted to temporarily reduce the power level specified to the power supply unit for the operation of the magnetron in a manner that allows a WLAN station of the wireless network to receive beacon frames transmitted by a WLAN access point of the wireless network. Alternatively to a WLAN, the wireless network may also be based on a different 2.4 GHz technology, such as, for example, ZigBee or Bluetooth. The magnetron and the power supply unit are preferably components of a high-frequency generator. The magnetron preferably generates microwaves in the 2.4 GHz ISM band. The temporary reduction in the power level may also cause the magnetron to be temporarily turned off. The power supply unit of the household appliance is preferably a switched-mode power supply. Alternatively, the power supply unit of the household appliance is a transformer power supply. The controller of the household appliance is preferably an electronic control unit.

By means of the present invention, the microwave is equipped with a controller that allows coexistence with WLAN or, more generally, with 2.4 GHz-based technologies (ZigBee, Bluetooth etc.). Although this coexistence is restricted (data rate is reduced, but still sufficient for household appliance applications), it allows communication and microwave operation to take place simultaneously. Disturbances of neighboring devices can also be reduced or completely prevented, depending on the required data rate.

In a preferred embodiment of the household appliance according to the present invention, the coexistence mode of the controller can be activated by a user during the operation of the household appliance or during the operation of the magnetron. The household appliance may have a user interface allowing a user to activate the coexistence mode of the controller. For example, the household appliance may have an input device, such as, for example, a touch screen, via which the coexistence mode of the controller is activatable by user input. Alternatively or additionally, the coexistence mode of the controller may be activated via a mobile terminal device, such as a smartphone, connected in signal communication with the household appliance, for example, via the wireless network. Since the coexistence mode of the controller can be activated manually, it is possible to activate it only when necessary, so that a reduction in data rate due to the coexistence mode of the controller can be avoided when the coexistence mode is not needed. Alternatively, the coexistence mode of the controller may be permanently activated during the operation of the household appliance or during the operation of the magnetron. The automatic activation of the coexistence mode of the controller makes it possible to effectively prevent disturbance of the communication over the wireless network without requiring further action of a user. Furthermore, the household appliance may be adapted to activate the coexistence mode of the controller automatically when it detects that the coexistence mode of the controller needs to be selected in order to prevent the communication in the wireless network from being disturbed. The need to select the coexistence mode of the controller to prevent disturbance may be detected, for example, based on the detection of communication over the wireless network. As a result of this, the coexistence mode of the controller is automatically activated as needed.

In another preferred embodiment of the household appliance according to the present invention, the controller is adapted to reduce, in the coexistence mode, the power level specified to the power supply unit for the operation of the magnetron in a plurality of temporally spaced-apart time slots. It is then possible to transmit, for example, the beacon frames over the wireless network within the time slots. A communication connection of one or more devices to the wireless network can then be maintained by transmitting the beacon frames within the time slots in which the power level for the operation of the magnetron is reduced. Furthermore, a communication can take place over the wireless network within the time slots. The time intervals between the time slots may be constant or variable. The time intervals between the time slots may be, for example, in the millisecond range. Furthermore, the temporally spaced-apart time slots may have a constant or variable duration. The duration of the time slots may be, for example, in the millisecond range.

Also advantageous is an inventive household appliance in which the controller is adapted to overlap, in the coexistence mode, the temporally spaced-apart time slots and/or the time intervals between the time slots with a random time slot. The random time slots may be positive or negative, so that the temporally spaced-apart time slots and/or the time intervals between the time slots may be extended or shortened by the overlap. The random time slots may be in the millisecond range. The overlapping with a random time slot significantly increases the rate of successfully transmitted beacon frames and the rate of successfully transmitted regular packets. The temporally spaced-apart time slots, the time intervals between the time slots, the random time slot and/or the reduction in the power level are configurable such that they can be adapted to different types of devices and different wireless networks. The configuration may be performed manually by a user. For example, the configuration may be done via a user interface of the household appliance. Alternatively or additionally, the household device may be adapted to retrieve a configuration data set from a database and to automatically perform the configuration based on the configuration data set. For example, the household appliance allows selection of a WLAN coexistence mode, a Bluetooth coexistence mode and/or a ZigBee coexistence mode.

In a further advantageous embodiment, the inventive household appliance has a radio module for communication over the communication network. The controller of the household appliance is preferably adapted to temporarily reduce, in the coexistence mode, the power level specified to the power supply unit for the operation of the magnetron in a manner that enables the radio module to receive beacon frames from the wireless network during the operation of the magnetron. By enabling the radio module to receive beacon frames from the wireless network during the operation of the magnetron, the connection of the household appliance to the wireless network can be ensured. The risk of connection interruptions or communication problems is thereby significantly reduced. The radio module is, for example, a WLAN module.

In a refinement of the household appliance according to the present invention, the controller is adapted to detect a connection loss between the radio module and the wireless network and, upon detection of the connection loss, temporarily reduce the power level specified to the power supply unit for the operation of the magnetron in a manner that restores the connection of the radio module to the wireless network. This control routine implements a feedback channel with which the communication capability of the household appliance in the wireless network can be monitored and, if necessary, restored. The control routine may, for example, detect that the time slots in which the power level for the operation of the magnetron is reduced are too small to achieve disturbance-free communication. In this case, the time slots in which the power level for the operation of the magnetron is reduced may be extended. Alternatively or additionally, the control routine may detect that the time intervals between the time slots in which the power level for the operation of the magnetron is reduced are too long to achieve disturbance-free communication. In this case, the time intervals in which the power level for the operation of the magnetron is not reduced may be shortened. Alternatively or additionally, the control routine may detect that the reduction in the power level for the operation of the magnetron during the time slots is not sufficient to achieve disturbance-free communication. In this case, the power level for the operation of the magnetron may be reduced to a greater extent during the time slots.

In another preferred embodiment, the household appliance according to the present invention is a solo microwave appliance or a microwave appliance with additional baking-oven or steam-cooking function.

In an embodiment, the present invention provides a method of the type mentioned at the outset. In accordance with the method of the present invention, the power level for the operation of the magnetron is temporarily reduced in a coexistence mode of the controller so as to reduce or prevent disturbance of the communication in a wireless network using beacon frames by the microwaves generated by the magnetron. The method is preferably carried out to control the operation of a household appliance according to any of the embodiments described above. Therefore, with regard to the advantages and modifications of the method according to the present invention, reference is initially made to the advantages and modifications of the household appliance according to the present invention.

In a preferred embodiment of the method according to the present invention, the coexistence mode of the controller is automatically activated by the household appliance when it is turned on. Alternatively, the coexistence mode of the controller is activated by a user during the operation of the household appliance or during the operation of the magnetron. Furthermore, the coexistence mode of the controller of the household appliance may be automatically activated by the household appliance itself when it is detected that the coexistence mode of the controller needs to be selected in order to prevent the communication in the wireless network from being disturbed.

In a refinement of the method according to the present invention, the temporary reduction in the power level for the operation of the magnetron in the coexistence mode of the controller is accomplished by reducing the power level for the operation of the magnetron during a plurality of temporally spaced-apart time slots, the temporally spaced-apart time slots and/or the time intervals between the time slots preferably being overlapped with a random time slot.

FIG. 1 shows a household device 10, which may be, for example, a solo microwave appliance or a microwave appliance with additional baking-oven or steam-cooking function.

Household appliance 10 includes a magnetron 12, a power supply unit 16 and a controller 18. Magnetron 12 is adapted to generate microwaves 14 in the 2.4 GHz ISM band during operation. Controller 18 of household appliance 10 specifies to power supply unit 16 the power level at which magnetron 12 is to be operated. Power supply unit 16 takes the form of a switched-mode power supply.

Controller 18 includes a coexistence algorithm 20. Coexistence algorithm 20 is activated as needed or manually by a user. Alternatively, coexistence algorithm 20 may also be activated by default. Coexistence algorithm 20 causes the microwave power P to be temporarily reduced or turned off in a controlled manner such that a WLAN access point of a wireless network will, with a certain probability, be able to successfully transmit beacon frames and that another device in the wireless network, which takes the form of a WLAN network, will receive the transmitted beacon frames despite the microwaves 14 generated by magnetron 12. Alternatively to a WLAN, the wireless network may be based on a different 2.4 GHz technology, such as, for example, ZigBee or Bluetooth.

Thus, the temporary reduction in the power level reduces or prevents disturbances in the communication of the devices in the wireless network. Coexistence algorithm 20 thus allows communication within the wireless network and microwave operation to take place simultaneously.

Household appliance 10 further includes a radio module 22 via which household appliance 10 itself can communicate with other devices over the wireless network. Radio module 22 is here in the form of a WLAN module. Controller 18 is adapted to temporarily reduce, in the coexistence mode in which coexistence algorithm 20 is used, the power level P specified to power supply unit 16 for the operation of magnetron 12 in a manner that enables radio module 22 to receive beacon frames from the wireless network during the operation of magnetron 12. By means of coexistence algorithm 20, household appliance 10 reduces or prevents disturbance of its own communication due to microwaves 14.

Moreover, controller 18 is adapted to detect, via feedback channel 24, a connection loss between radio module 22 and the wireless network and, upon detection of the connection loss, temporarily reduce the power level P specified to power supply unit 16 for the operation of magnetron 12 in a manner that restores the connection of radio module 22 to the wireless network.

Figure 2:
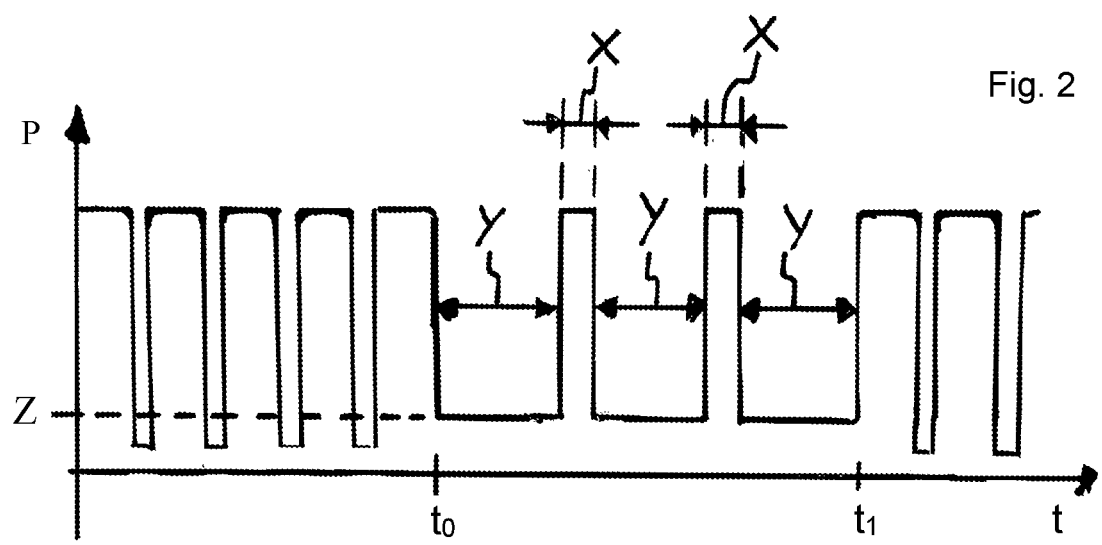
FIG. 2 is a schematic diagram showing the variation over time of the power level specified to the power supply unit for the operation of the magnetron.

FIG. 2 illustrates the temporary power reduction by coexistence algorithm 20. Power P is plotted over time t. The coexistence mode of controller 18 is active between times $t_0$ and $t_1$, so that coexistence algorithm 20 is applied during this period.

This causes the power level P for the operation of magnetron 12 to be reduced to a power level Z during a plurality of temporally spaced-apart time slots Y. The temporally spaced-apart time slots Y and/or the time intervals X between the time slots Y may be overlapped with a random time slot. The random time slots may be positive or negative, so that the temporally spaced-apart time slots Y and/or the time intervals X between the time slots Y may be extended or shortened by the overlap. This makes it possible to significantly increase the rate of successfully transmitted beacons and regular packets.

The time intervals X between the time slots Y, the time slots Y, the reduced power level Z and the overlappable random time slots are configurable such that they can be adapted to different types of devices and different wireless networks. Optionally, it is possible to configure the different modes via a user interface (UI) of household appliance 10. In this manner, it is possible, for example, to select a WLAN coexistence mode, Bluetooth coexistence mode or a ZigBee coexistence mode.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 household appliance
12 magnetron
14 microwaves
16 power supply unit
18 controller
20 coexistence algorithm
22 radio module
24 feedback channel
t time
$t_0$, $t_1$ points in time
P power, power level
X time intervals
Y time slots
Z reduced power level

What is claimed is:

1. A household appliance, comprising:
   a magnetron configured to generate microwaves during operation;
   a power supply unit; and
   a controller configured to specify to the power supply unit a power level for the operation of the magnetron,
   wherein the controller is configured, in a coexistence mode in a plurality of temporally spaced-apart time windows, to temporarily reduce the power level specified to the power supply unit for the operation of the magnetron in order to reduce or prevent disturbance of communication in a wireless network using beacon frames by the microwaves generated by the magnetron, the controller being configured, in the coexistence mode, to randomly lengthen or shorten the temporally spaced-apart time windows or time periods between the time windows.

2. The household appliance as recited in claim 1, wherein the household appliance is configured to activate the coexistence mode of the controller automatically when it is detected that the coexistence mode of the controller needs to be selected in order to prevent the communication in the wireless network from being disturbed.

3. The household appliance as recited in claim 1, further comprising a radio module configured to communicate over the communication network,
   wherein the controller is configured to temporarily reduce, in the coexistence mode, the power level specified to the power supply unit for the operation of the magnetron in a manner that enables the radio module to receive beacon frames from the wireless network during the operation of the magnetron.

4. The household appliance as recited in claim 3, wherein the controller is configured to detect a connection loss between the radio module and the wireless network and, upon detection of the connection loss, temporarily reduce the power level specified to the power supply unit for the operation of the magnetron in a manner that restores the connection of the radio module to the wireless network.

5. The household appliance as recited in claim 1, wherein the household appliance comprises a solo microwave appliance or a microwave appliance with an additional baking-oven or steam-cooking function.

6. A method for controlling the operation of the household appliance according to claim 1, the method comprising the steps of:
   generating microwaves by the magnetron of the household appliance; and
   controlling the power level for the operation of the magnetron by the controller of the household appliance, by temporarily reducing, in the coexistence mode of the controller, the power level for the operation of the magnetron in a manner that reduces or prevents disturbance of the communication in the wireless network using beacon frames by the microwaves generated by the magnetron as a temporary reduction in power, the temporary reduction in power being carried out by reducing the power level for the operation of the magnetron during the plurality of temporally spaced-apart time windows, the temporally spaced-apart time windows or time periods between the time windows being lengthened or shortened at random.

7. The method as recited in claim 6, further comprising the following step:
automatically activating the coexistence mode of the controller of the household appliance by the household appliance upon determining that the coexistence mode of the controller needs to be selected to prevent the communication in the wireless network from being disturbed.

8. The method as recited in claim 6, wherein the household appliance comprises a radio module configured to communicate over the communication network, and
wherein the method further comprises the step of determining a loss of connection between the radio module and the wireless network and, after determining the loss of connection, temporarily reducing the power level for the operation of the magnetron to restore connection of the radio module to the wireless network.

9. The method as recited in claim 8, wherein the temporarily reducing occurs during the plurality of temporally spaced-apart time slots, and
wherein the temporally spaced-apart time slots or time intervals between the time slots are overlapped with a random time slot.

* * * * *